J. R. BROWN.
Pipe-Tongs.
No. 142,143. Patented August 26, 1873.
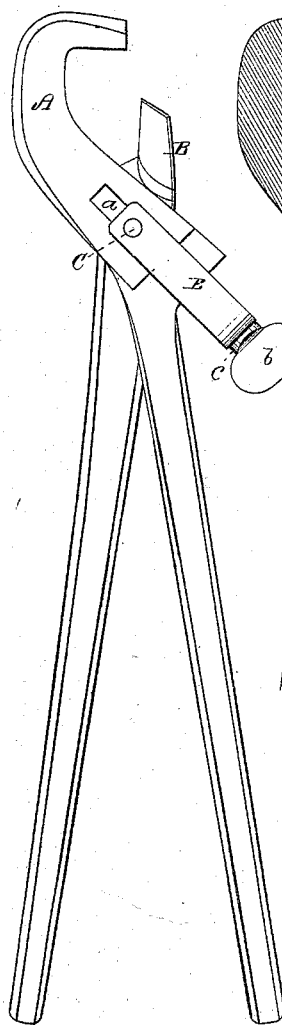
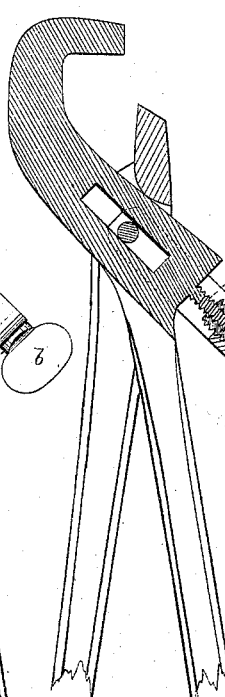
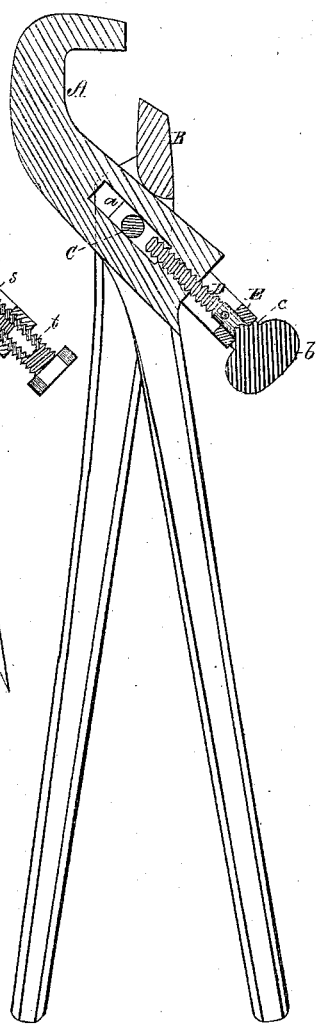
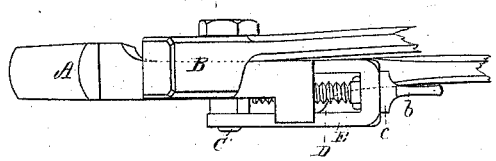
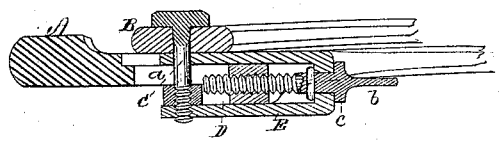
Witnesses.
S. N. Piper.
L. W. Möller.
James R. Brown.
by his attorney
R. H. Eddy

UNITED STATES PATENT OFFICE.

JAMES R. BROWN, OF CAMBRIDGEPORT, MASSACHUSETTS, ASSIGNOR TO HIMSELF AND HAZEN P. HUNTOON, OF SAME PLACE.

IMPROVEMENT IN PIPE-TONGS.

Specification forming part of Letters Patent No. 142,143, dated August 26, 1873; application filed March 15, 1873.

*To all whom it may concern:*

Be it known that I, JAMES R. BROWN, of Cambridgeport, of the county of Middlesex and State of Massachusetts, have invented a new and useful Improvement in Pipe-Tongs; and do hereby declare the same to be fully described in the following specification and represented in the accompanying drawings, of which—

Figure 1 is a side elevation, Fig. 2 a top view, Fig. 3 a longitudinal section, and Fig. 4 a transverse section, of my new pipe-tongs. Fig. 5 is a longitudinal section, showing a compound screw for operating the hooked jaw.

In some respects the article is analogous to that for which Letters Patent No. 22,157 were granted to me on November 30, 1858, but in others it differs essentially therefrom.

In carrying out my present invention I have combined a yoke with the toothed and jawed levers, their fulcrum-pin, and the adjusting screw or screws thereof, the purpose of the yoke being to support the pin and relieve it from contact with and direct strain of the screw or screws; also, to save weakening the pin by forming through it a hole to receive the journal in the end of the screw.

In the drawings, A is the hooked-jaw lever, while B is the toothed lever, they being crossed on one another, and connected by a fulcrum-pin, C, which goes through them, the yoke F, and a slot, $a$, formed through the hooked-jaw lever. The yoke spans the latter lever in manner as shown, which, on opposite sides, is notched to receive the yoke and guide it in its longitudinal movements.

The operative screw D (shown in Figs. 2, 3, 4) of the fulcrum-pin, disposed in the longer axis of the slot $a$, screws at the end of the slot into the jaw-lever, but does not pivot in or bear against the fulcrum-pin, as it does in my former pipe-tongs. The screw goes through the head of the yoke and turns freely therein, and outside of such is provided with a handle, $b$, furnished with a shoulder, $c$, to rest against the yoke-head. A pin, $d$, goes transversely through the screw, and projects in opposite directions beyond it a short distance. The said pin and shoulder serve to maintain such a connection of the yoke and the screw as will admit of the latter being revolved on its axis, and cause the yoke to either advance or recede with the screw.

Instead of the screw being pivoted in the yoke and screwed into the hook-jaw lever, it may be pivoted in the latter and be screwed into the yoke.

In Fig. 5 the screw D is shown as composed of two screws, $s\,t$, one of which is right-threaded and screws into the other or left-threaded screw concentrically. One projects from and is fastened to the hooked-jaw lever, and the other screws through the head of the yoke. These screws, one right-threaded and the other left-threaded, are to have the same pitch to their threads, in order that one screw may move as fast as the other. Consequently, when the outer screw is in revolution, the hook-jaw lever will be moved rectilinearly twice as fast as either of the screws $s\,t$.

As the fulcrum-pin goes through a hole in the toothed lever and fits closely thereto, it will be seen that, as a natural consequence, the said lever and the fulcrum-pin will be moved simultaneously by the yoke and the screw, while the latter may be in the act of being revolved.

In my new pipe-tongs the parts are easier oiled, the fulcrum-pin is better supported, can be made stronger, and is less liable to be twisted or bent.

I make no claim to a bolt and rod cutter, constructed as represented in C. O. Read's application for a patent filed February 6, 1860, in which the yoke is arranged to clasp both jaw-levers, and has a screw entirely disconnected from either, whereby the yoke not only holds the fulcrum-pin to disadvantage, but is liable continually to drop down out of place. In my tongs the arrangement of the yoke is such that it embraces the hook-jaw lever only, and slides in or on it, and the screw either goes into or is fixed to and projects from the jaw-lever, whereby the yoke is always kept in place, and is prevented from either tipping upward or falling out of line or place against the jaw-lever.

I therefore claim as my invention—

In pipe-tongs, the yoke E, the screw D, (whether single or double, as set forth,) the fulcrum-pin C, the toothed lever B, and the slotted and hooked lever A, constructed, arranged, and combined substantially as specified.

JAMES R. BROWN.

Witnesses:
R. H. EDDY,
J. R. SNOW.